United States Patent
Thubert et al.

(10) Patent No.: US 6,603,769 B1
(45) Date of Patent: Aug. 5, 2003

(54) METHOD AND SYSTEM FOR IMPROVING TRAFFIC OPERATION IN AN INTERNET ENVIRONMENT

(75) Inventors: Pascal Thubert, Vence (FR); Jean Lorrain, Vence (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/302,339

(22) Filed: Apr. 29, 1999

(30) Foreign Application Priority Data

May 28, 1998 (EP) .......................................... 98480035

(51) Int. Cl.[7] .............................................. H04L 12/28
(52) U.S. Cl. ..................... 370/401; 370/389; 370/469; 709/227; 709/230; 709/238
(58) Field of Search ................................ 370/401, 403, 370/404, 405, 406, 408, 902, 355, 315, 356, 351, 389, 400, 432, 469, 255, 465–468; 709/223, 220, 226, 227, 238, 249, 242

(56) References Cited

U.S. PATENT DOCUMENTS

| | | | |
|---|---|---|---|
| 4,794,594 A | | 12/1988 | Picard |
| 5,309,437 A | | 5/1994 | Perlman et al. |
| 5,473,599 A | * | 12/1995 | Li et al. ........................ 370/16 |
| 5,708,654 A | * | 1/1998 | Arndt et al. ................. 370/242 |
| 5,854,901 A | | 12/1998 | Cole et al. |
| 5,884,043 A | | 3/1999 | Teplitsky |
| 5,917,820 A | | 6/1999 | Rekhter |
| 5,917,825 A | * | 6/1999 | Cohen ......................... 370/401 |
| 5,918,019 A | * | 6/1999 | Valencia ................. 395/200.57 |
| 5,920,699 A | * | 7/1999 | Bare ...................... 395/200.55 |
| 6,115,385 A | | 9/2000 | Vig |
| 6,189,042 B1 | * | 2/2001 | Keller-Tuberg ............. 709/238 |
| 6,262,988 B1 | | 7/2001 | Vig |

OTHER PUBLICATIONS

Multiprotocol Interconnect over Frame Relay, Brady et al., RFC1490, Network Working Group, Jul. 1993, pp. 1–34.

* cited by examiner

Primary Examiner—Dang Ton
Assistant Examiner—Tri Phan
(74) Attorney, Agent, or Firm—Cesari and McKenna, LLP

(57) ABSTRACT

A method and system for improving traffic operation in an internet environment by speeding up data packet transfers between a source host attached to a first Local Area Network (LAN), and a target host attached to a second (different) LAN, both LANs being interconnected by a router. The invention enables said router self configuring into a bridge over the path between said source and target hosts, selectively and dynamically during traffic operation. To that end, upon first packet being sent, the source host pushes said packet over the first LAN toward the router. When receiving said first packet, the router reads its IP table locating the target host on its LAN, and then runs a conventional ARP over its LAN to get the address of the target sending back its MAC address. The router stores the MAC address of the target host into an ARP table and sets an entry into a so-called transparent bridging table accordingly. The router reconfigures itself into Proxy-ARP to simulate it is the target host, and sends the first packet over the second toward the target host. The router applies then a conventional ICMP over the first LAN to get all hosts (including the source host) located on the first LAN updating their IP routing table to simulate the target host as being attached to the first LAN. Before sending next packet, the source host runs an ARP protocol over the first LAN. The router answers with MAC address for the target host. The source sends this second packet to IP address for the target host with MAC address for the target host over the first LAN, and the router bridges.

18 Claims, 7 Drawing Sheets

METHOD AND SYSTEM FOR IMPROVING TRAFFIC OPERATION IN AN INTERNET ENVIRONMENT

FIELD OF INVENTION

A method and system for improving traffic communications operation over a complex interconnected network by speeding up data packet transfers using conventional protocols such as Internet Protocol (IP). More particularly, the invention interconnects Ethernet/IP Hosts over Ethernet switches, Local Area Networks (LAN) and Wide Area Networks (WAN) by virtually enlarging the LAN until it encompasses the WAN so that dynamic self-bridging can communicate anywhere in the network.

BACKGROUND ART

Modern digital networks are made to operate in a multimedia environment and interconnect, upon request, a large number of users and applications through complex digital communication networks.

Accordingly, due to the variety of user's profiles and distributed applications, the corresponding traffic is consuming more and more bandwidth, non-deterministic and requiring more connectivity. This has been causing emergence of fast packet switching techniques in which data from multimedia origin are chopped into fixed length packets (e.g., in Asynchronous Transfer Mode (ATM) type of operation) or into variable length packets (e.g., in so-called Frame Relay (FR) type of operation). These packets are then transferred upon request for communication purposes between data sources and targets via so-called high speed communication networks. One of the key requirements for high speed packet switching networks is to reduce the end to end delays.

Also, due to the increase of traffic, several types of networks have been installed which need to be interconnected together to optimize the possibilities of organizing traffic between any source host and a target host both located anywhere on different LANs. This is made possible by using so-called internetworking. An internet is a collection of heterogeneous networks using a set of networking protocols (i.e., TCP/IP, Transmission Control Protocol/Internet Protocol) developed to allow cooperating computers to share resources across the network. TCP/IP products are made by many vendors and a fairly large number of networks of all kinds use it. Accordingly, IP switching technologies may incorporate new proprietary protocols, which complicates networking operations. TCP/IP is a set of data communication protocols that are referred to as the Internet protocol (IP) suite. Because TCP and IP are the best known of the protocols, it has become common to use the term TCP/IP to refer to the whole family. TCP and IP are two of the protocols in this suite. Other protocols that are part of the Internet suite are User Datagram Protocol (UDP), Internet Control Message Protocol (ICMP), Address Resolution Protocol (ARP), Real Time Protocol (RTP), Reservation Protocol (RSvP) etc.

The Internet is a collection of heterogeneous networks using TCP/IP. The administrative responsibilities for Internet (for example, to assign IP addresses and domain names) can be within a single group or distributed among multiple groups. Networks comprising an internetwork can use either the same or different technologies.

(For more information on TCP/IP one may refer to "Internet Working with TCP/IP" by Douglas Comer).

For example, as represented in FIG. 1, an internetwork may include networks A and B with attached stations (S1, S2, S3) using so-called Local Area Network (LAN) technology, such as token-ring, Ethernet, FDDI etc., to communicate. While within a network C, including nodes (N interconnected by links L) communication is made possible through so-called Wide Area Network (WAN) technologies including Frame Relay (FR), X.25, Asynchronous Transfer Mode (ATM) etc.

Host stations such as S1, S2, S3 . . . can each send messages from any of them to any other station. Communication within a single network is referred to as intranetworking, and communications between stations that are attached to different networks is called internetworking. Stations within a same network can communicate directly, while internetworking communications have to go across special internetworking devices called gateways and labeled R in FIG. 1 (sometimes referred to as routers as they route data from one network to another).

As shall be discussed in the following description, the gateways or routers may, in some cases, be replaced by so-called bridges. Both have specific characteristics as they operate at different layers of protocol of the network.

As computer networks have developed, various approaches have been used in the choice of communication characteristics such as communication medium, network topology, message formats, protocols for channel access etc. Some of these approaches have been converted into Standards. A model of these Standards is known as the International Standards Organization (ISO) Open System Interconnection (OSI) model. This model specifies a hierarchy of protocol layers and defines the function of each layer in the considered network. Each layer in one station which might be a host computer or a router/bridge, carries a conversation with the corresponding layer in another station with which communication is taking place, in accordance with the protocol defining the rules of this communication. In fact, information is transferred down from layer to layer in one host or router source then through the channel medium back up the successive layers in the other host or router/bridge.

Three layers (out of seven), which have been defined by the OSI Standards iclude: the physical layer, the data link layer and the network layer. The physical layer is the lowest layer assigned to transmission of data bits over the communication channel. Design of the physical layer involves issues of electrical, mechanical or optical engineering depending on the physical medium used to build the communications channel. (IETF standardizes TCP/IP thru RFCs (Requests for comments).

The main task of the layer next to the physical layer, i.e. the data link layer, is to transform the physical layer interfacing with the channel into a communication link that appears error-free to the next above layer, i.e. the network layer. The data link layer performs such functions as structuring data into packets or frames and attaching control information numbers to the packets or frames to enable checking data validity and reinserting reconstructed packets at the right location into the data flow. There are two point-to-point types: connectionless and connection oriented.

Although the data link layer is primarily independent of the nature of the transmission medium, certain aspects of the data link layer functions are dependent on the transmission medium. This is why, in some network architectures, the data link layer is divided into two sub-layers: a local control sublayer which performs all medium-independent functions of the data link layer, and a Media Access Control (MAC) sub-layer. The MAC sub-layer determines which station should get access to the communications channel, when requests for access are in conflictual situation. The functions of the MAC sub-layer are more likely to be dependent on the transmission medium nature. Bridges may be designated to operate in the MAC sub-layer.

As the internetwork topologies become more and more complex, the number of routers or bridges used to interconnect the network (see FIG. 1) become more and more important. Consequently, the choice between router and bridge devices for performing the interconnecting function may seriously impact the whole internetwork performances, e.g., in terms of transmission time delay, as each has its own advantages and disadvantages as known by any person skilled in the art.

To enable fully understanding the concerns, we shall briefly describe some of the respective characteristics of both routers and bridges.

The basic function of a bridge is to make large interconnected networks look like a single flat LAN. Bridges act at MAC layer level and listen to all message traffic on all networks (e.g. LANs) to which it is connected and to forward each message onto the networks other than the one from which the message was heard. Bridges also maintain a database of station locations derived from the content of the messages being forwarded. After a bridge has been in operation for some time, it can associate practically every station with a particular link (i.e. path) connecting the bridge to a network (e.g. LAN).

There are two main types of bridges: Transparent Bridges and Source Route Bridges, and combinations of these.

If several networks are interconnected by bridges and form a closed loop, a message may be circulated back to the network from which it was originally transmitted, which may flood the internetworking facility and jam the traffic. To prevent the formation of such closed loop a so-called Spanning Tree algorithm has been developed to connect the bridged networks into a tree configuration containing no closed loops. The spanning tree algorithm is executed periodically by the bridges on the interconnected network to ensure that the tree structure is maintained, even if the physical configuration of the network changes. Basically the bridges execute the spanning tree algorithm by sending special messages to each other to establish the identity of a "root" bridge. The root bridge may be selected, for convenience, as the one with the smallest numerical identification. The algorithm determines which links of the bridges are to be active and which are to be inactive, i.e. disabled, in configuring the tree structure. One more piece of terminology is needed to understand how the algorithm operates. Each network has a "designated" link which means that one of the links connectable to the network is designated to carry traffic toward and away from the root bridge. The basis for this decision is similar to the basis for selecting the root bridge. The designated link is the one providing the least costly (shortest) path to the root bridge, with numerical bridge identification being used as a tie-break. Once the designated links are identified, the algorithm chooses two types of links to be activated or closed: first, for each network its designated link is chosen, and second, for each bridge a link that forms the "best path" to the root bridge is chosen, i.e. a link through which the bridge received a message giving the identity of the root bridge. All other links are inactivated. Execution of the algorithm results in interconnection of the network and bridges in a tree structure, i.e. one having no closed loops.

While the basic advantage of the bridge (totally multi-protocol; i.e: transparent to layer 3) is the rapidity of message transfers, these transfers operating at data link layer (i.e. layer 2), some traffic overflow may be due to bridge transparency. For instance, this is the case with TCP/IP traffic caused by so-called Address Resolution Protocol (ARP) messages made to obtain, when required, a data link layer address from the corresponding network layer address. ARP packets can be duplicated by bridges and storm the whole internetwork up to disrupting normal traffic flow.

But as far as this invention is concerned, it should essentially be recalled that bridges are transparent to broadcast messages which may then multiply and propagate through the whole internetwork. This is particularly true when bridging to build databases based on the source MAC address that flows. When a match is not found in the database, the considered packet being processed is bridged causing waste of bandwidth.

On the other hand, a router, unlike a bridge, operates at the network layer level instead of the data link layer level, and is fundamentally meant to interconnect unlike network technologies and provide a structure address space (routing based on global address. Addressing at the network layer level, as obtained by the content of data packet address field includes a unique network identifier and a target identifier within the network.

Routers learn the topology of the network and build a routing table to represent it. Tables are established manually or thru Routing Protocols (RIP, OSPF, BGP . . . , where routers learn how to reach "networks".

Routers make use of the destination network identifier in a message to determine an optimum path from the source network to the destination network. But as far as the present invention is concerned it should be noted that broadcasted messages shall be stopped by any reached router. Consequently, in internetworking environment, routers provide a better isolation than bridges at the expense of processor utilization, time consumption and protocol sensitivity (each protocol needs different layer 3 router).

Compromises to these kinds of situations have been proposed in the art. Some have an impact on source and/or target hosts software. Then given the fairly wide variety of hosts already in the field no simple and unique solution to the problem raised may be proposed. Other solutions, like for instance the solution recommended by U.S. Pat. No. 5,309,437, addresses extended LANS and uses so-called bridge like routers including both functions. Then, discriminating on the type of traffic either one of the functions is called for use. Unfortunately during ARP operation all normal traffic is made to suffer.

SUMMARY OF THE INVENTION

One advantage of this invention is to enable improving high speed data transfers in internetwork environment by using Internet Protocol (IP) intelligence to drive self bridging configuration of conventional routers, combine effectiveness of IP routing protocols to find paths and bridging to switched packets.

Another advantage of this invention is to enable improving high speed data transfers in internetwork environment by using IP intelligence to enable self configuring routers into bridges, dynamically, during data traffic on the specific path used for connections toward a designated target host.

A further advantage of this invention is to enable improving high speed data transfers in internetwork environment requiring only limited broadcasting to enable self-configuring routers into bridges.

Another advantage of this invention is to provide a solution for efficient self-configuring routers into bridges for paths set between source and target hosts respectively attached to different LANs.

The foregoing and other objects, features and advantages of this will be made apparent from the following more detailed particular description of a preferred embodiment of the invention as illustrated in the accompanying figures.

This invention is a method for improving high speed traffic operation in an internet environment using standardized protocols of the so-called Internet Protocol (IP) suite, by speeding up data packet transfers between a source host (S) attached to a first Local Area Network (LAN) (N1), and a target host (T) attached to a different LAN (N2), both LANs being interconnected by a router (R) establishing connections at OSI Standard network level (layer 3) through use of so-called IP table, by enabling said router self-configuring into a bridge connecting at data link level (layer 2) through use of so-called Media Access Control (MAC) sublayer table, over the path between said source and target hosts, selectively and dynamically during traffic operation, said method including:

upon first packet being to be sent, pushing said packet over said first LAN toward said router R;

upon receiving said first packet, R reading its IP table locating the next hop for the target host (T) on N2, and then:

running a conventional so-called Address Resolution Protocol (ARP) over N2 to get the identified target (T) sending back its MAC address;

storing T MAC address into an ARP table and setting an entry into a so-called transparent bridging table accordingly;

reconfiguring itself into so-called Proxy-ARP to simulate it is T; sending said first packet over N2 toward T; and; applying a conventional so-called Internet Control Message Protocol (ICMP) over N1 to get all hosts (including S) located on N1 updating their IP routing table to simulate T as being attached to N1, whereby the target T is being fictively transferred upward on network N1;

upon second packet being to be sent by S toward T, having S running an ARP protocol over N1, then:
R answering with T MAC address;
S sending said second packet to T IP address with T MAC address over N1, and R bridging.

Said method recursively extend then to more complex networks including different types of LANs and WANs up to the Internet, whereby T will be fetched by last router and brought back hop by hop to first router, with each router storing T into its table.

DETAILED DESCRIPTION OF A PREFERRED EMBODIMENT OF THE INVENTION

Figure 1:
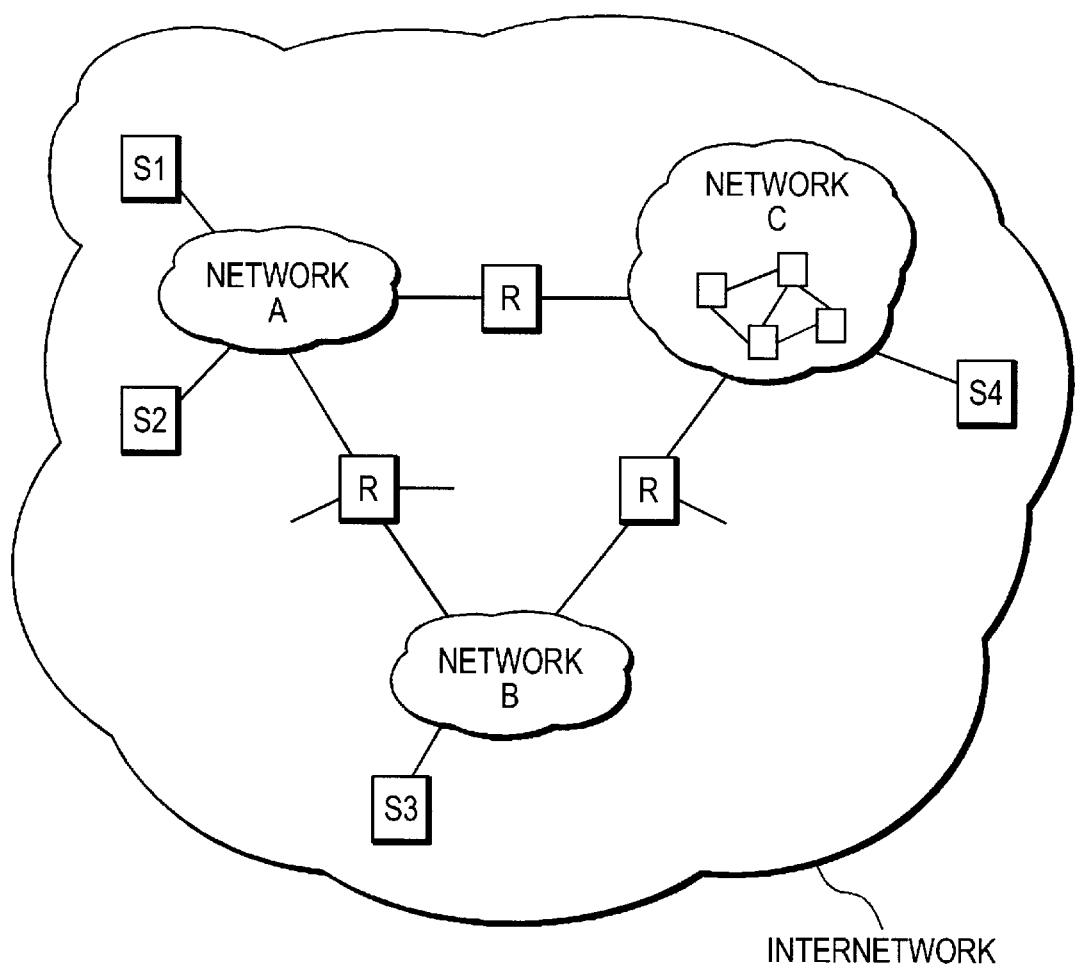
FIG. 1 is a schematic representation of an internetwork environment wherein the invention shall be implemented.

FIG. 1, an internetwork may include networks A and B with attached stations (S1, S2, S3) using so-called Local Area Network (LAN) technology, such as token-ring, Ethernet, FDDI etc . . . , to communicate. While within a network C, including nodes (N interconnected by links L) communication is made possible through so-called Wide Area Network (WAN) technologies including Frame Relay (FR), X.25, Asynchronous Transfer Mode (ATM) etc.

Host stations such as S1, S2, S3 . . . can each send messages from any of them to any other station. Communication within a single network is referred to as intranetworking, and communications between stations that are attached to different networks is called internetworking. Stations within a same network can communicate directly, while internetworking communications have to go across special internetworking devices called gateways and labeled R in FIG. 1 (sometimes referred to as routers as they route data from one network to another).

Figure 2:
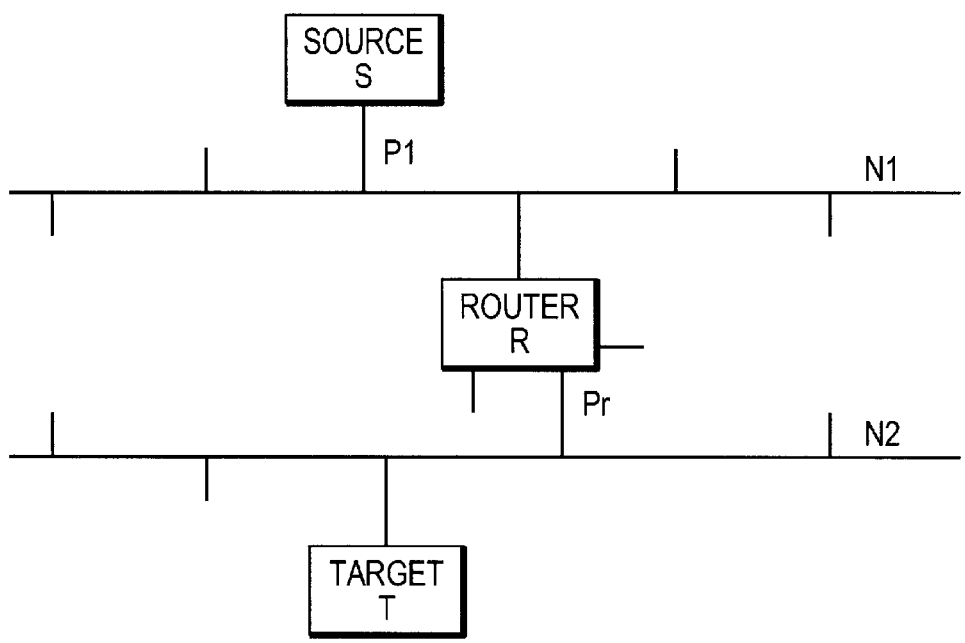
FIG. 2 is made to illustrate the invention in the simple case of two interconnected Local Area Networks (LAN).

FIG. 2 illustrates the invention in the simplest case wherein two hosts are exchanging data via a router interconnecting their Ethernet LANs. A source host S connected to a first LAN N1 that should provide data traffic to a target host T attached to a second LAN N2, via a router R. Using the process of the invention, a bridge connection through router R shall be dynamically established between source host (S) and target host (T) so that both hosts will seem to be connected to same LAN network. The conventional Spanning Tree protocol shall be freed from configuring the router R into a bridge, by letting IP intelligence perform that operation. More precisely, the proper router intelligence used for establishing a path to the traffic sent from source host S toward target host T shall be used to reconfigurate, on the background, the router R into a bridge for the specific path selected as being used once by IP. Conversely, when the connection is disrupted, the corresponding bridging should be cleared.

As the bridging operation shall be equivalent to reporting the target T into the LAN1, i.e. upward toward the source, it would also apply to multiple networks connected in cascade via routers. This feature and others shall be made more apparent from the following description extended up to complex internetwork operation.

Prior to going back to FIG. 2 and detail the method and means for implementing the invention, it might appear useful to remind the meaning of some terms to be used herein. As already mentioned the data to be transported over the network are split into packets (also called frames or datagrams).

Each packet includes, in addition to the data (user data or control data) to be transported over the network, so called header information for a number of characteristics defining the type of packet and enabling defining the path toward the target, as well as validity checking data (CRC) to enable discarding data corrupted by layer 1 at the network receiving end. The main items in the header are the source and destination IP addresses. The source IP address is the address of source host S. It is required to enable the target host to know where the data came from. The destination IP address is the address of target host T, which is necessary so that any router in the network can route the packet to its final destination. Each layer adds a specific header (2, 3, 4 etc), with layer 3 on network address control, layer 2 on MAC control and CRC, etc.

If the target host T is attached to a network to which the source host S is attached to the same subnet mask, the packet can be sent via so-called direct routing process. Indirect routing occurs when the target host is not on a network directly attached to the source host. In this internetworking situation, the way to reach the destination is via one or more routers. The address of the first of these routers, defining a so-called first hop is designated as an indirect route. The first hop address is the only information needed by the source host. The router which receives the packet has responsibility for a second hop, and so on. A host can tell whether a route is direct or indirect by examining network and subnetwork number parts of the IP address part of the header. If they match one of the IP addresses of the source host, the route is a direct one.

Each host keeps the set of mappings between destination IP addresses and the IP addresses of the next hop routers for those destinations in a table called the IP Routing Table. Three types of mapping can be found in this table, i.e.: direct routes for locally attached hosts; indirect routes for networks known for being reachable via one or more routers; and a so-called default route which contains the IP address of a router to be used for all IP addresses which are not covered by the direct and indirect routes.

Another question that may arise is how to obtain a LAN address corresponding to an IP address. This feature is addressed by a protocol called ARP, i.e Address Resolution Protocol. Each system is provided with an ARP table. If the source has the required information in its ARP table, the packet header is completed accordingly. Otherwise there is no way to send the packet until the destination LAN address is determined. The ARP protocol is then used by broadcasting an ARP request. Every host listens to the ARP request, the one recognizing an ARP request for itself (i.e. its IP address) is required to respond with its MAC address. The ARP requester will save this information into its ARP Table (that maps IP address into MAC address), so future packets can be sent directly to the MAC address. In other words, ARP is the protocol used to dynamically tie a high level IP address to a low level physical MAC address. ARP is only across a single physical network. But router R gets the ARP message. According to this invention for the target host, R shall then act as a so-called Proxy ARP, i.e. answer to ARP request intended for target IP address for the target host T located on a different LAN than the source host S, by supplying MAC physical address for the target host T, thus, pretending to be the target host T and accepting to route the packets toward the target host T.

Another tool used in this invention is the so-called Internet Control Message Protocol (ICMP) used for error messages and other control messages. Specifically, gateways (e.g. routers and bridges) as well as hosts use ICMP to send reports of problems about packets, back to the original source that sent the packets. ICMP messages are sent in IP packets.

Now in view of the above considerations, let's turn back to FIG. 2 and detail the invention implementation to the corresponding network configuration. The method shall include the following steps:

(1) Assume an application in the source host S needs to send data (i.e. IP packets) to the target host T. To that end, the source host S uses its IP routing table which should enable matching a target IP address with two kinds of information: One identifying the source host S exit port, and the second defining next hop IP. Best match in IP routing table shall designate, when starting the process, the so-called "default" routing information: e.g port P1 and next hop IP address of router R. S encapsulates the IP packet with adequate 802.3/Ethernet header (as defined by EEE Standards) and pushes it over the network N1.

(2) (a) When receiving the data, the router R reads its IP routing table which indicates on which port (e.g: Port Pr) the target is, i.e. on network N2.

But R is not aware of T's data link layer (level 2 address, i.e. MAC address of T,) if we assume that the process is starting which means that T's MAC address has not been stored into R's ARP Table.

(b) Accordingly, ARP protocol is used over network N2, i.e. the router R broadcasts an ARP over the network N2. All hosts attached to network N2 receive the ARP message looking for MAC address of the target host of T mapping with IP address of T, but only the target host T answers by an ARP reply (IP address of T→MAC address of T). R enters this information into its own ARP table.

By the way, one should note that, assuming another router is connected to network N2, it will receive the ARP request but will not propagate it further.

(c) The system should proceed with creating a so-called transparent bridged connection into the router R. To that end the router R is provided with a Transparent Bridge Table which should match T MAC address with the port (MAC address T→Port $P_r$) The packet might then be bridged between corresponding IN/OUT ports of the router R. For that specific connection the router R shall reconfigurate to be able to answer in Proxy ARP and be able to answer to ARPs with the IP address for the target host T with T's MAC address thus creating a virtual connection toward T.

(3) Then the router R sends, as limited broadcast, an ICMP redirect message over the network N1, implying that T's IP address is on N1. All hosts on network N1, including the source host S will receive that ICMP message and create a host entry in their IP routing tables. As a consequence all these hosts will consider the target host T as being on network N1. In other words, the target host T is being fictionally transfered upward toward the source network N1.

It should be noted that the transparent bridging support must be configured so that it only bridges when a match is found as opposed to conventional support. In this case, IP is responsible for feeding the Transparent bridge database.

Also, it seems wise to configure the bridge support not to perform conventional spanning tree process. The routing protocol should ensure that there are not two routes to a given host, so that only one router on a network simulates the target.

Another problem deals with packet sizes. As TCP/IP is designed for use in many different kinds of networks, TCP has the ability to negotiate about packet size. When a TCP connection first opens, both ends send the maximum packet size they can handle. The smaller of these numbers is used for the rest of the connection.

However, when two TCP endpoints are not adjacent, one or multiple IP routers will be involved in forwarding TCP data. A problem created in this case is that endpoints do not know about all the intermediate networks and may negotiate a maximum datagram size that is larger than can be accepted within one of the intermediate networks. For this reason IP routers generally implement provisions to split packets up into pieces. This is referred to as fragmentation. The IP header contains a field to indicate if a packet has been split and information to enable the pieces be put back together. As an option to the present invention, the transmit side Maximum Transport Unit (MTU) could be added to the bridge database. Packets that exceed the MTU would be passed to upper layer for routing and fragmentation. IP packets may thus be desequenced. If this is done fast enough, IP's of fast recovery should be avoided. This is where $IP_{V6}$ ICMP "packet too big" would be very useful. Upon a too large packet, a router would advertise the transmit MTU. The source would use the smallest MTU received.

Once an entry in the transparent bridging table has been added by the router R, same router adds the IP address for the target T in its Proxy-ARP support, so now it will respond to ARP requests that look for T's IP address, with T's MAC address, if this support was not already created.

When the source host S receives the ICMP redirect from the router R, it adds a host direct route to T on its interface to N1. This is a conventional process.

(4) When the source host S needs to send next packet (i.e. in the present case, the second packet after the invention process started), it will find out in its own IP routing table, that the target host T is on its own network (i.e network N1). The source host S will pass said second packet to its own interface on N1, with T's IP address being next hop.

But since the source host S does not know the target host's T's MAC address, there is no corresponding entry in ARP table for the source hosts. Then the source host S shall broadcast an ARP request for the IP address for the target host T and the router R, configured in Proxy ARP, will respond with MAC address for the target host T. The ARP table for the source hosts is updated accordingly.

Said second packet is then sent to T's IP address with T's MAC address over the network N1 and since the router R is now reconfigured into a bridge for the considered connection, this second packet is bridged by the router R toward the network N2 at data link layer (level 2). The target host T is normally virtually present on the network N1.

Figure 3:
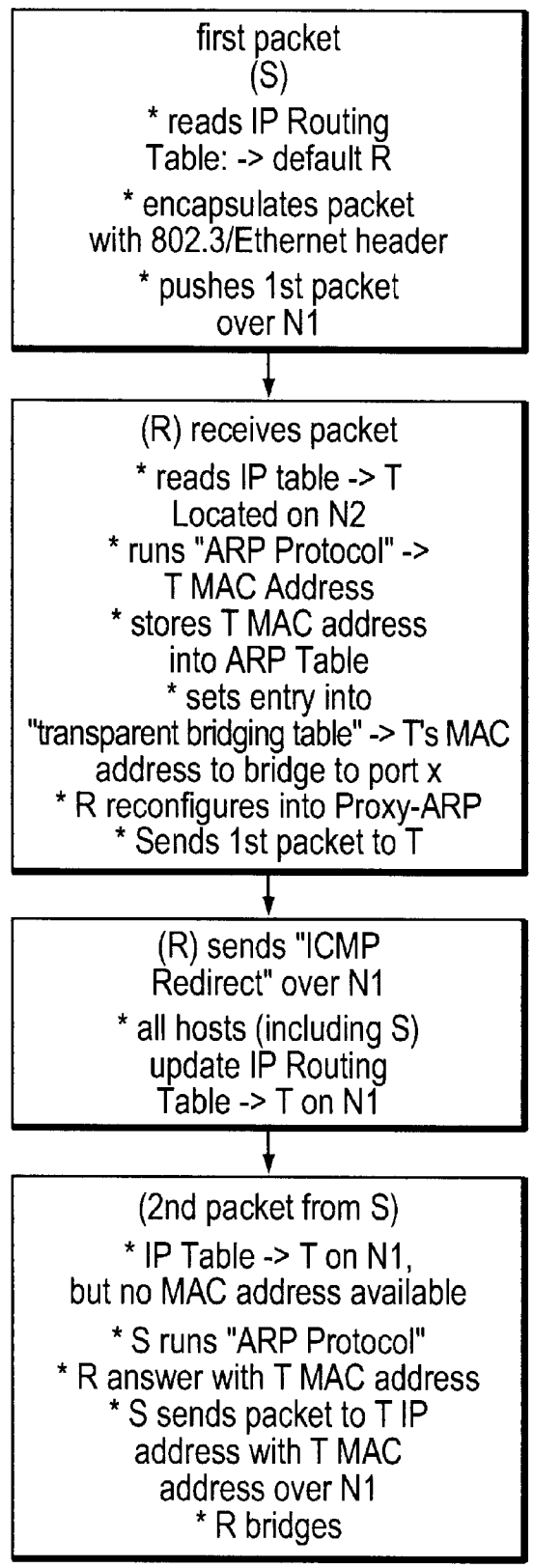
FIG. 3 is a flowchart for implementing the invention.

The basic self bridging process of this invention, as described above may be summarized by the flowchart of FIG. 3:

First step:
for sending first packet, the source host S reads its IP routing table. Since no path was already set-up to route packet towards the target host T, the source host S selects default router R.
the source host S encapsulated properly 1st packet and pushes it over network N1.
Second step: the router R receives the packet and:
reads its IP routing table which locates the target host T on its port connected to N2.
the router R sends an ARP request looking for T's MAC address, the target host T answers with ARP reply, the router R updates its ARP table by matching (IP address T)→(MAC address T)
R configures its transparent bridging table from port-in to port-out and configures into Proxy ARP to answer to requests for the target host T.
first packet is sent to the target host T.
Step 3:
the router R sends an ICMP redirect over N1
S updates its routing table thus simulating that T is on network N1 (R being Proxy-ARP configured)
Step 4: 2nd packet from S to be sent:
S IP table indicates T on N1 but no MAC address available
S runs ARP protocol; R answers with T MAC address
2nd packet is sent over N1 with T MAC address and R bridges.

As far as backward traffic from the target host T to the source host S is concerned, an analogous overall process should be applied to virtually adding the address of the source host S to network N2 by configuring the corresponding router, which might be different from R, into a bridge for the considered connection. In other words, by simply reserving the source host S and the target host host T, functions and replacing the network N1 by the network N2, the whole process would be the same as above.

Figure 4:
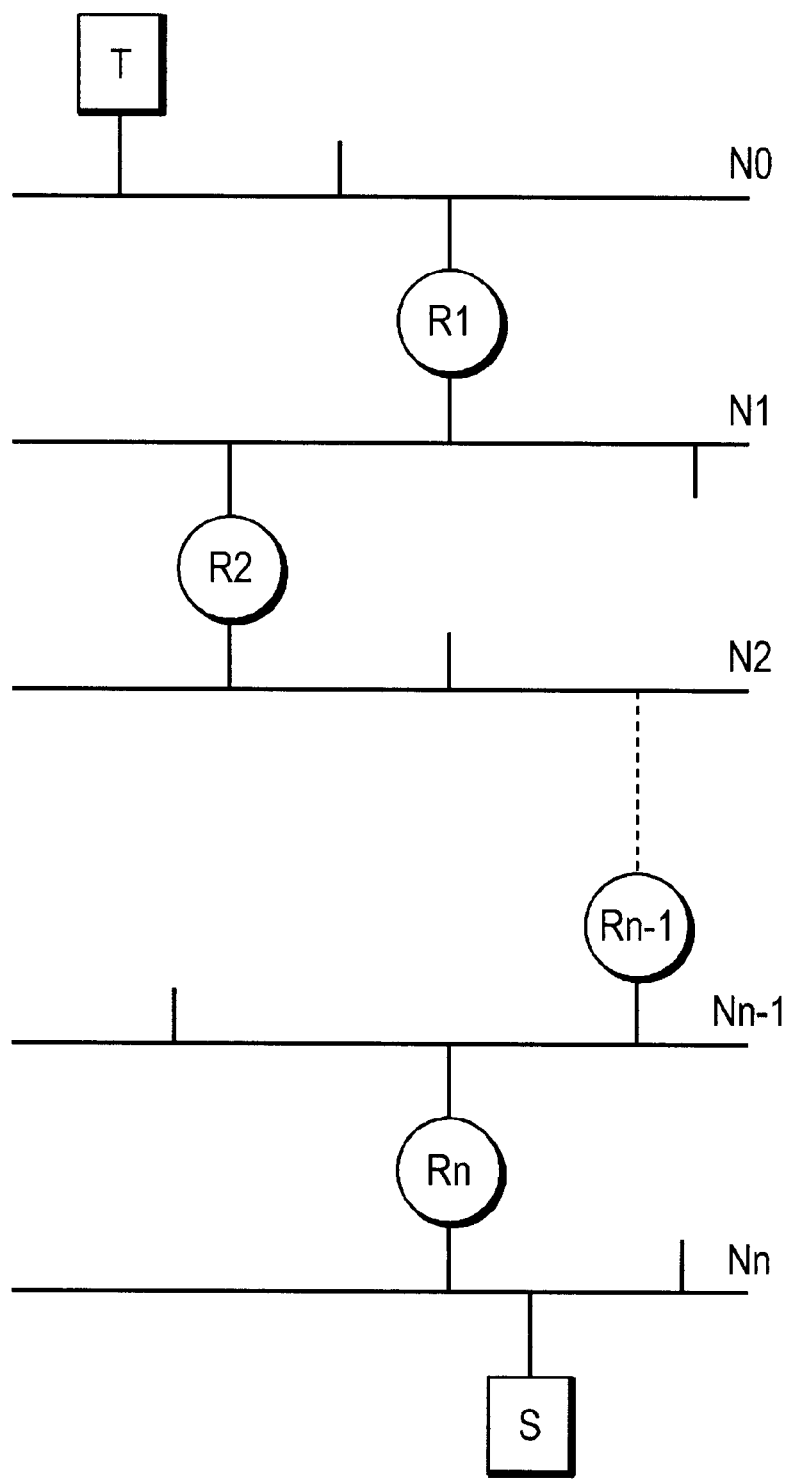
FIG. 4 extends the invention operation as illustrated by FIG. 2 to a cascade of LANs between source and target.

Let's now extend the network of FIG. 2 to a cascade of consecutive networks as represented in FIG. 4. The source host (S) is now located on LAN $N_n$. It should be connected to target (T) on LAN $N_o$, through successive LAN networks N1, N2, ..., Nn−1 Nn interconnected by routers R1, R2, Ri, Ri+1 ... Rn−1, Rn.

In the simple case of FIG. 2 the IP packet was pushed onto the network N2 by a host. In the case of FIG. 4, the packet on network Nn is pushed by Router Rn−1. As far as router Rn is concerned, this makes little difference. The router Rn can assume the role of router R and simulate it is the target host T, performing the inventions requirement on the router expressed in the simple case. This works because the router Rn determines that the target host T is directly attached to it. As such, the router Rn still broadcasts the ICMP redirect as a limited broadcast over network Nn.

The invention thus provides that router Rn−1 does accept the ICMP redirect that is usually received by hosts. In other words, usually routers being devices more intelligent than hosts would not accept routing orders as requested by an ICMP redirect. The router sets its route as a result of its own routing protocols and not because of an ICMP order generally provided to a host by a router and here provided by a router to another router.

The router $R_{n-1}$ will accept the redirect order only if it comes from the network that the routing table indicates as the network to the next hop anyway, and if the destination of the packet is the advertised next hop. In other words, only direct routes on the right path will be added to the routing table.

Accordingly, the process as developed with reference to a unique routing according to FIG. 2 can be recursively extended to more complex network of FIG. 4 throughout the transmission of successive packets from the source host S toward the target host T. The system starts with bridging router R1 to establish a direct connection through router Ri meaning that as far as the source host S is concerned, the target T looks as being on network N1 rather than network N0. Then with subsequent packets, the direct connection is established through router R2, looking as if the target host T were on network N2 rather than network N1, and so on up to networks $N_{n-1}$ and then $N_n$. At this point, a fully bridged connection is established between the source host S and the target host T, like in the simple case of FIG. 2.

Figure 5:
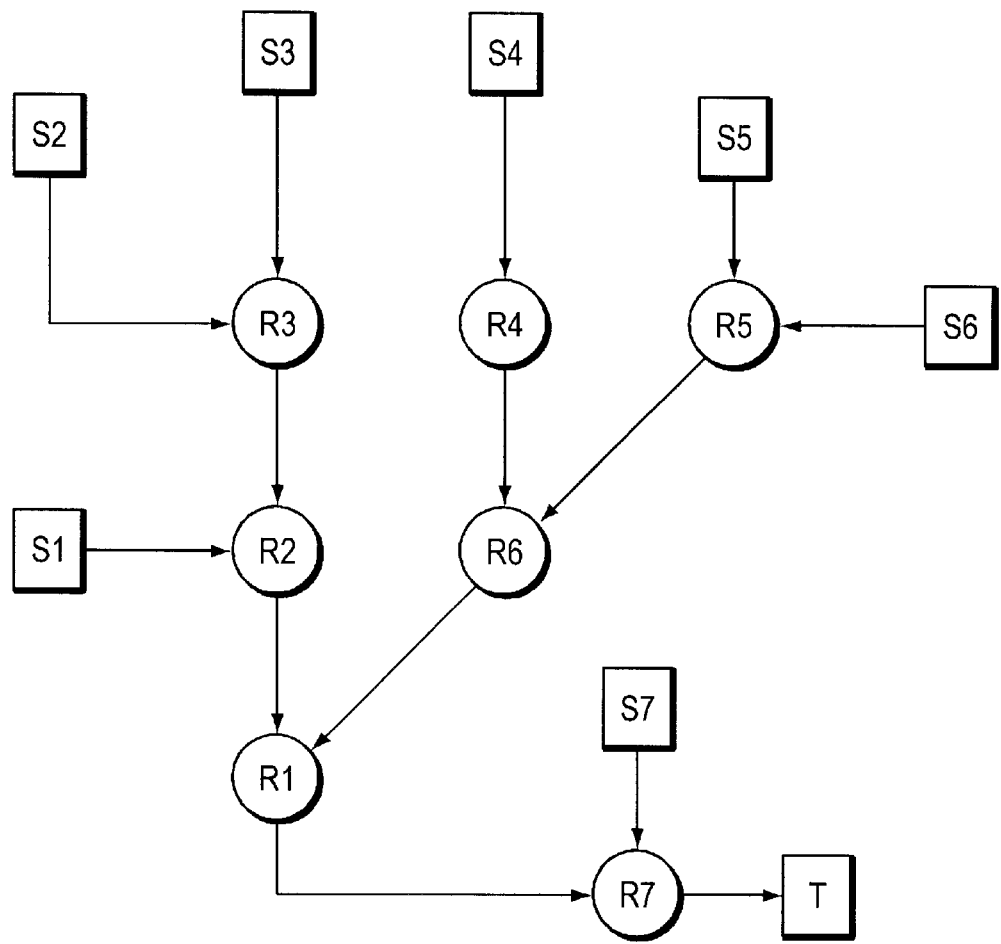
FIG. 5 illustrates an internetwork configuration with several source hosts being connected to a same target host.

Now, further extension of the application of this invention toward a more complex network may include considering the case where several sources need to reach same target (T). As represented in FIG. 5, the target is labeled (T), the sources S1 through S7 and the connections are made via routers R1 through R7 according to the topology illustrated in the FIG. 5.

In operation and given the process of the invention as described above, one may understand that, in the situation illustrated in FIG. 5, wherever the first packet to target T came from, it caused the last router before the target host T (i.e. router R7) to be bridged to simulate it is the target host T, as described above. Then the bridging connection builds up one hop upon a new incoming packet, and up in the direction of the operating source. Then when a new source is made operative, the new bridging construction will add the last router in the IP path toward the target host T that was not already in the connection and again up to that new source involved. The first router that was already in the connection due to previous source to target direct path, setting, even though it was added for a different source, both sources shall share same rest of the way down to the target host T, in the routing tables. After some time, the bridged network looks like the flow of a river, growing larger as the target approaches, getting more and more traffic from affluent connections.

In the case of a network as shown in FIG. 5, seven sources reach target T. Say, first, the source host S1 sends a first packet. Upon that packet, R7 decides to simulate being the target host T for the network going up to R1. So the router R7 sends an ICMP redirect to the router R1. Upon the second packet from the source host Si to the target host T, the router R1 now simulates the target host T for the network up to routers R2 and R6. After the third packet, the source host S1 has now a bridged path to the target host T.

Now, suppose source host S3 sends a packet to the target host T. Router R3 and host Si being on different networks, the router R2 did not simulate T toward R3. But the routers R1 and R7 still do it. The end result is that the routers R2 will now simulate the target host T towards router R3. Upon the next packet, the router R3 will simulate the target host T toward sources S2 and S3. So, if S2 needs to send a packet to the target host T, the direct connection will take place right away. And so on for sources S4, S5 and S6, the bridging process can be established similarly.

The reverse "bridged" path will be established independently thru same mechanism as what was the target host T becomes the source, and sends a reverse packet addressed to what was the source host S, now the target for the reverse packet.

In any of the internetwork bridging situations considered above, whenever the traffic or the physical medium is down, then the bridging(s) establishing direct path(s) should also be deleted (i.e. restored into original router configuration). To that end, the specific tables used should be cleared accordingly and set back to their original state prior to bridging(s). This function is also achieved by ICMP redirect operations. In the simplest case (FIG. 2) the router R broadcasts an ICMP redirect and the host route toward the target T becomes an indirect route again.

As far as more complex networks are concerned (FIG. 4 or 5) restoring the bridges into routers is achieved as done for the bridging operations, i.e. by successive steps.

More generally speaking, the next hop to which a router on the path bridges the traffic may sometime be down, not willing to bridge anymore, or the physical medium to it may be down. If every router guarantees the next hop, then it can be expected that the whole path is available from the first router to the target.

To cover that the next hop is not willing to bridge anymore, ARPs maybe sent on a regular basis (e.g., every 30 seconds) for those IP addresses that were learned through ICMP redirect. Also, when the routing table is updated by the routing protocols, the router checks that new computed path to the target is through the same next network as the path that was used to create the bridged connection.

If ARP fails or if the next network changes:
1) the ICMP redirect added entry to the lost IP address is deleted from the routing table.
2) the router also removes all the bridge entries to the failed resources
3) if it still has a route to the destination, the router keeps recognizing the MAC addresses (if possible) but passes the packets to the net handler for backup routing. The entry is cleaned after a further 30 second timer.
4) Proxy ARP is not provided anymore.
5) A classical ICMP redirect is sent over the networks from which a bridge existed to the failed resource, now providing the next hop router (indirect route) found in the routing table. The ICMP redirect again is a limited broadcast, specifying the right next hop router. All hosts on N1 including S will receive that ICMP message and modify the a host entry in their routing table. Note: The invention provides that the routers process the ICMP redirect for indirect routes to host by cleaning their ICMP redirect added direct routes to these hosts, if any.

If a hop is lost, the connection will attempt to get around it using the routing protocols best route from there.

Down to this point, and as illustrated in the figures we have only considered LAN networks (e.g. Ethernet). To go to different types of networks the network other than LAN require encapsulating the Ethernet packet (e.g frame relay FRF3, RFC 1490 Ethernet encapsulation with CRC), or mapping it (e.g.802.3/802.5 conversion) to enable multiprotocol operation.

When going to or coming from a token ring network, there is no specific requirement on the host itself. Traditional Translation Bridge translating 802.3/802.5 may take place when a router has one leg on an Ethernet/LAN and the other leg on a token ring. Token Ring Format can still be used when bridging between two token rings.

When a router or a host is on the connection via a wide area network or WAN such as Frame Relay, the encapsulation technique is used (RFC 1490 bridge). This means that the WAN net handler is responsible for encapsulating/decapsulating the network header and for exchanging packets with an Ethernet stack. In the case of a router, the Ethernet stack must support the transparent bridging function, so if the target MAC address is found in the bridging database, the Ethernet packet will be passed to the transmit port. Otherwise, normal Ethernet net handler process is ran, and the packet will be passed to layer 3, for instance to the IP stack for classical IP routing.

When bridging to a WAN, the bridging table is required to provide information that point in the transmit port plus the transmit virtual channel when needed. The transmit side net handler will understand that information, add the network header and transmit on the virtual channel, using a different RFC 1490 format, that is the bridge format, as opposed to the classical routed format.

The ICMP redirects and ARP exchanges described above do not have to be encapsulated in Ethernet packets when going to the WAN. Also, traditional WAN IP traffic (eg frame relay NLPID xCC) can still be routed by the router the traditional way. If the router has a bridged connection to the destination via a WAN, it may encapsulate the packet in an Ethernet fashion and transmit it over the bridge connection.

Figure 6:
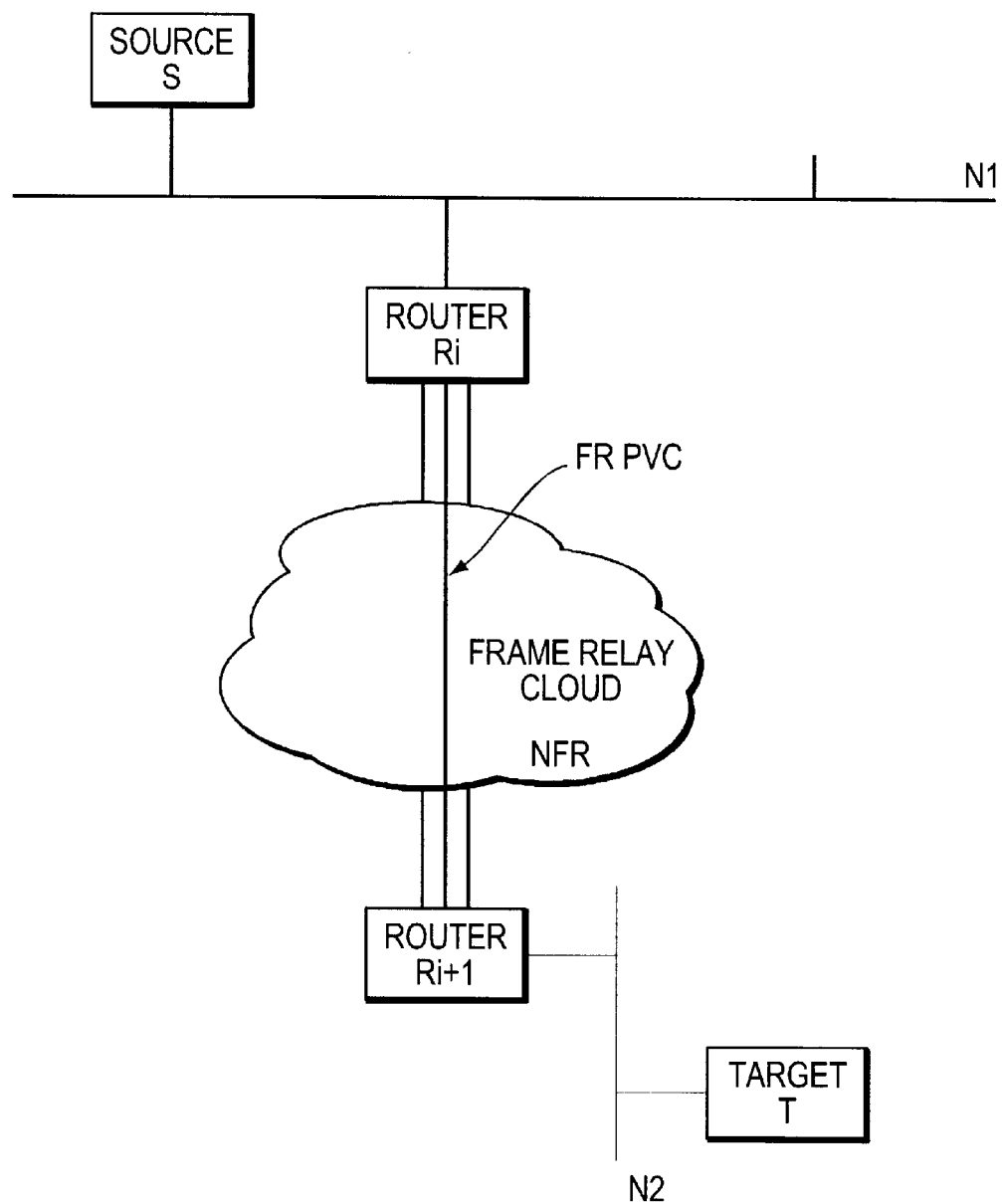
FIG. 6 illustrates the invention as applying to a complex internetwork configuration encompassing a Frame Relay network into a WAN.

Let's illustrate this Internet type of operation with the example shown in FIG. 6. Ethernet networks N1 and N2 are connected to a Frame Relay network (Nfr) via routers R1 and R2 respectively. Now, a source host (S) attached to Ethernet network N1 wishes to reach a target host (T) attached to Ethernet network N2 and this with a high speed operation as provided by the present invention. According to the present invention, the routers R1 and R2 should be configured into bridges and the Ethernet packets header should simply be encapsulated to get Frame Relay format.

But to match with the invention, we shall use a packet format used by bridges, instead of router format which supports encapsulation. The technique to be used herein is known as "split bridging". Accordingly, as far as the source host S and the target host T are concerned, the routers and the frame network. (R1,Nfr and R2) shall look like a unique bridge, with two half bridges interconnected via a WAN/Nfr. Routers R1 and R2 could be hard coded for partnership as two half bridges interconnected by a fictional bus. An FRF3 SNAP encapsulation shall then be performed at exit port of the router R1, and a decapsulation at the router R2 entry port.

Figure 7:
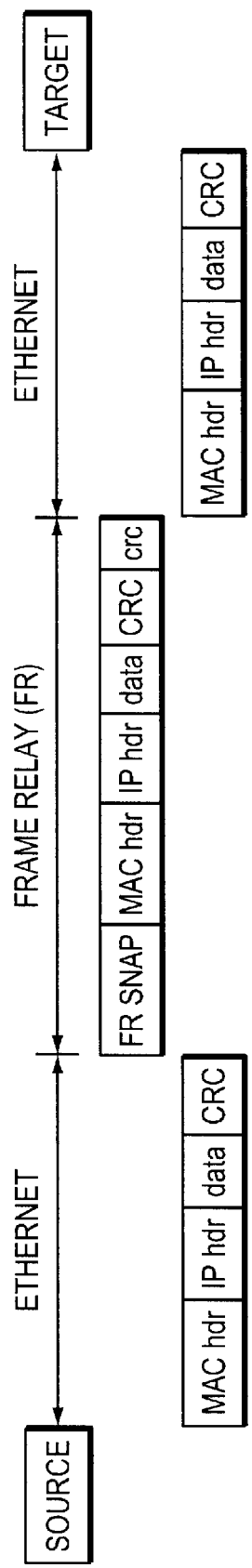
FIG. 7 shows the data frame structures (i.e; datagrams) used in the system of FIG. 6 operation.

FIG. 7 illustrates the encapsulation scheme. The Ethernet type format (802.3) are represented on both sides, with the FRF3 SNAP format for the Frame Relay in between. The Ethernet format includes a MAC header, an IP header then the data followed by validity checking CRC. The FRF3 SNAP encapsulation means adding an FR SNAP header and a CRC checking frame for the overall format.

Similar reasoning applies to other networks, like an ATM network for instance.

Accordingly, high speed data transfer function is provided by this invention, transforming complex routing into selective straight-forward self-bridging operations, which not only applies to an Ethernet network, but may be extended further to more complex networks, up to Internet, as a result of properly applied conventional split bridging.

Many modifications and adaptations to the preferred embodiment disclosed above will be apparent to those skilled in the art to which the present invention pertains. Further, some of the features of the present invention could be used to advantage without the corresponding use of other features. Accordingly, the invention described in the foregoing paragraphs is meant as illustrative of the principles of the present invention only and not in limitation of its scope.

Having thus described the invention, what is claimed is:

1. A method for improving traffic operation over a network comprising the steps of:

pushing a first packet to be sent from a source host to a target host over a first LAN connected to the source host and a router;

reading an IP table at the router to locate the target host on a second LAN connected to the router in response to the pushing of the first packet;

running an Address Resolution Protocol (ARP) over the second LAN to obtain a MAC address for the target host;

storing the MAC address for the target host into a transparent bridging table at the router;

reconfiguring the router to simulate that it is the target host, sending the first packet over the second LAN to the target host and sending an Internet Control Message Protocol message over the first LAN to update a routing table in hosts connected to the first LAN with the address of the target host; and when a second packet is sent from the source host to the target host running an address resolution protocol over the first network, with the router answering with the MAC address for the target host and the source sending said second packet to the MAC address of the target host over the first network with the router bridging.

2. A method for improving traffic operation over a network according to claim 1 said method further including the step of predefining said router as a default route between the first and second LANs.

3. A method for improving traffic operation over a network in an using Internet Protocol (IP) protocols, by speeding up data packet transfers between a source host attached to a first Local Area Network (LAN), and a target host attached to a second LAN, according to claim 1, said method being further characterized in that said first and second LANs are both Ethernet LANs, and the method includes the step of providing said packet with a standard 802.3 Ethernet header to allow bridging when possible.

4. A method for improving traffic operation in an internet environment using protocols of the Internet Protocol (IP) suite, by speeding up data packet transfers between a source host attached to a first Local Area Network (LAN), and a target host attached to a second LAN, according to claim 1, wherein said first and second LANs are both token ring networks and the method further includes the steps of providing data packets with 802.5 headers.

5. A method for improving high speed traffic operation in an internet environment using standardized protocols of the Internet Protocol (IP) suite, by speeding up data packet transfers between a source host attached to a first Local Area Network (LAN) and a target host attached to a different LAN, through a cascade of LANs interconnected by routers, said method including the steps of claim 1 recursively throughout the transmission of successive packets and upwardly from the target host to the source host attached routers, whereby the target host is being fictively transfered upward and the corresponding routers are recursively bridged accordingly one hop at a time over the consecutive packets being provided by the source.

6. A method according to claim 5 wherein said target host is connected to an Ethernet LAN $N_0$ and said source host is connected to an Ethernet LAN $N_n$, with a cascade of LANs (N1, N2, ..., Nn−1) in-between, interconnected by routers R1, R2, Rn−1, Rn, respectively, with said recursive bridging being applied from R1 up to Rn throughout the transmission of successive packets.

7. A method for improving high speed traffic operation in an internet environment using standardized protocols of the Internet Protocol (IP) suite, by speeding up data packet transfers between several source hosts attached to different Local Area Networks and a target host, according to claim 5 and further characterized in that said routers self-bridging are performed upwardly throughout consecutive packets transmission only to non yet bridged routers.

8. A method for improving traffic operation over a network comprising the steps of:

a. pushing a first packet to be sent from a source host to a target host over a first LAN connected to the source host and a router;

b. reading an IP table at the router to locate the target host on a second LAN connected to the router in response to the pushing of the first packet;

c. running an Address Resolution Protocol (ARP) over the second LAN to obtain a MAC address for the target host;

d. storing the MAC address for the target host into a transparent bridging table at the router;

e. reconfiguring the router into a proxy address resolution protocol system to simulate that it is the target host, sending the first packet over the second LAN to the target host and sending an Internet Control Message Protocol message over the first LAN to update a routing table in hosts connected to the first LAN with the address of the target host;

f. when a second packet is sent from the source host to the target host running an address resolution protocol over the first network, with the router answering with the MAC address for the target host and the source sending said second packet to the MAC address of the target host over the first network with the router bridging; and g. running said ARP protocols on a predefined time basis and, if ARP fails, then performing the following operations:

deleting from the routing table, the ICMP redirect added entry to the lost IP address;

having the router remove all the bridge entries to the failed resource;

if a route still exists to the target, then keeping the router recognizing the MAC address but performing backup routing for a next packet, then cleaning the table entry at next time reference;

stop providing Proxy ARP; and sending a conventional ICMP redirect over the network from which a bridge existed to the failed resource, now providing the next hop indirect route found in the routing table.

9. A method for improving traffic operation in a system as set forth in claim 6 further extended to a WAN by including any network using protocols encapsulating Ethernet format between a first router and a next router hard coded as two half-bridges according to the split-bridging operation, said method including:

performing over each Ethernet packet from source host toward target host, an encapsulation and appending to said encapsulated packet, a crc portion, at the exit port of the first router;

feeding the considered encapsulated packet into said network using protocols encapsulating Ethernet format toward the next router; and, decapsulating the received packet at an entry port of the next route and removing the crc prior to feeding the packet down toward the target host.

10. A method according to claim 9 wherein said network using protocols encapsulating Ethernet format is a token ring network.

11. A method for improving traffic operation in a system as set forth in claim 10 further includes using the standard RFC 1490 Ethernet encapsulation scheme for the encapsulating the packet.

12. A communications system comprising:

a first network including a first host;

a second network including a second host;

a coupling device connected between the first and second network for transmitting packets between the first host and the second host, said coupling device having:

an IP table which locates the second host on the second network when the coupling device receives a packet from the first host intended for the second host;

a message generator for creating an Address Resolution Protocol (ARP) message over the second network to obtain a Media Access Control (MAC) address for the second host;

a storage for the MAC address of the second host; and a message generator to update hosts on the first network with the address for the second host on the second network whereby a next packet being sent from the first host to the second host is addressed with the MAC address for the second host with the coupling device bridging.

13. A method for operating a router comprising the steps of:

receiving a first packet from a source host connected to a first LAN, said first LAN being connected to said router;

forwarding said first packet to a target host connected to a second LAN, said second LAN reachable from said router;

running an Address Resolution Protocol (ARP) over said second LAN to obtain a media access control (MAC) address for said target host, storing said MAC address for said target host into a transparent bridging table at said router;

sending the MAC address to said source host; and when a second packet having said MAC address as a target address is received from said source host, bridging said second packet to said target host.

14. The method of claim 13 comprising the step of:

reconfiguring said router to simulate that it is said target host.

15. A router comprising:

a first interface to a first network, said first network including a first host;

a second interface which can reach a second network, said second network including a second host, said first and second interfaces allow for transmitting of packets between said first host and said second host;

a message generator for creating an Address Resolution Protocol (ARP) message to said second network to obtain a Media Access Control (MAC) address for said second host;

a storage for said MAC address of said second host; and a message generator to update said first host on said first network with said MAC address for said second host, whereby a next packet being sent from said first host to said second host has said MAC address for said second host, and said router responding to said MAC address of said second host by routing said next packet to said second host.

16. Apparatus for improving traffic operation over a network comprising:

means for forwarding a first packet from a source host to a target host over a first LAN connected to said source host and a router;

means for running an Address Resolution Protocol (ARP) over said second LAN to obtain a media access control (MAC) address for said target host, means for storing said MAC address for said target host into a transparent bridging table at said router; and when a second packet is sent from said source host to said target host including said MAC address as a target address, means for said router routing, in response to said MAC address in said second packet, said second packet to said target host.

17. The apparatus of claim 16 further comprising:

means for sending an Internet Control Message Protocol message over said first LAN to update a routing table in hosts connected to said first LAN with said address of said target host.

18. A method for improving high speed traffic operation as in claim 1, further comprising:

said method being further characterized in that said ARP protocols are run on a predefined time basis and, if ARP fails, then performing the following operations:

deleting from the routing table, the ICMP redirect added entry to the lost IP address;

having the router removing all the bridge entries to the failed resource;

if a route still exist to the target, then keeping the router recognizing the MAC address but performing backup routing of a next packet, then cleaning the table entry at next time reference;

stop providing Proxy ARP; and sending a conventional ICMP redirect over the network from which a bridge existed to the failed resource, now providing the next hop indirect route found in the routing table.

* * * * *